(12) United States Patent
Klose et al.

(10) Patent No.: US 10,753,727 B2
(45) Date of Patent: Aug. 25, 2020

(54) TERAHERTZ MEASUREMENT DEVICE

(71) Applicant: INOEX GmbH Innovationen und Ausruestungen fuer die Extrusionstechnik, Melle (DE)

(72) Inventors: Ralph Klose, Melle (DE); Roland Boehm, Altenberge (DE)

(73) Assignee: INOEX GmbH Innovationen und Ausruestungen fuer die Extrusionstechnik, Melle (DE)

( * ) Notice: Subject to any disclaimer, the term of this patent is extended or adjusted under 35 U.S.C. 154(b) by 0 days.

(21) Appl. No.: 16/341,485

(22) PCT Filed: Oct. 17, 2017

(86) PCT No.: PCT/DE2017/100891
§ 371 (c)(1),
(2) Date: Apr. 12, 2019

(87) PCT Pub. No.: WO2018/072789
PCT Pub. Date: Apr. 26, 2018

(65) Prior Publication Data
US 2019/0301853 A1    Oct. 3, 2019

(30) Foreign Application Priority Data
Oct. 17, 2016   (DE) .......................... 10 2016 119 728

(51) Int. Cl.
*G01B 11/06* (2006.01)
*G01N 21/3581* (2014.01)
(Continued)

(52) U.S. Cl.
CPC ............ *G01B 11/06* (2013.01); *G01B 21/047* (2013.01); *G01N 21/3581* (2013.01); *G01N 21/8901* (2013.01); *G01S 13/88* (2013.01)

(58) Field of Classification Search
CPC .. G01B 11/06; G01B 21/047; G01N 21/3581; G01N 21/3586; G01N 21/8901; G01N 21/952
See application file for complete search history.

(56) References Cited

U.S. PATENT DOCUMENTS

| 6,873,931 B1* | 3/2005 | Nower ................. G01B 11/272 702/151 |
| 2015/0268030 A1* | 9/2015 | White ................. G01B 21/042 250/353 |
| 2016/0265901 A1 | 9/2016 | Kyriakis | |

OTHER PUBLICATIONS

Transcript and screenshots of YouTube video title "Single Point Gauge" from YouTube channel Picometrix uploaded and published on Jan. 15, 2015. (Year: 2015).*

(Continued)

*Primary Examiner* — Chih-Cheng Kao
(74) *Attorney, Agent, or Firm* — Collard & Roe, P.C.

(57) ABSTRACT

The invention relates to a THz measuring device (1) for determining at least one layer thickness (a1, a2, a3, a4) of a test object (20, 120, 220), the measuring device Messgerät (1) comprising:
a THz transmitter and receiver unit (14) for emitting THz radiation (15) along an optical axis (A) and for receiving reflected THz radiation (16) along the optical axis (A),
a controller unit (10) for driving the transmitter and receiver unit (14)
Hereby, the THz measuring device (1) is preferably portable including a grip region (34) for grabbing and positioning by the operator,
whereby it comprises, at a front end are (5), in particular, a moulded screen (5), a support contour (7) including several support points (P, P1, P2, P3, P4) for being (Continued)

applied to a curved surface (18) of the test object (20, 120, 220), for perpendicular positioning on the surface (18, 118, 218).

16 Claims, 5 Drawing Sheets

(51) Int. Cl.
    *G01S 13/88*     (2006.01)
    *G01N 21/89*     (2006.01)
    *G01B 21/04*     (2006.01)

(56) References Cited

OTHER PUBLICATIONS

Single Point Gauge, youtube, Jan. 15, 2015 (Jan. 15, 2015), p. 2 pp., XP054977976, Retrieved from the Internet: URL:https://www.youtube.com/watch?v=zhuZ465Wkj4, 12 pages, downloaded Jun. 26, 2019.
International Search Report in PCT/DE2017/100891, dated Jan. 15, 2018.
Irl N. Duling, III: "Handheld THz Security Imaging", Proceedings Optical Diagnostics of Living Cells II, SPIE, US, vol. 9854, May 26, 2016, pp. 98540N-1-98540N-6.
E. Pickwell-MacPherson: "Terahertz pulsed imaging in vivo", Optical Interactions with Tissue and Cells XXII, SPIE, vol. 7897, No. I, Feb. 10, 2011, pp. 78970C-1-78970C-6.

\* cited by examiner

TERAHERTZ MEASUREMENT DEVICE

CROSS REFERENCE TO RELATED APPLICATIONS

This application is the National Stage of PCT/DE2017/100891 filed on Oct. 17, 2017, which claims priority under 35 U.S.C. § 119 of German Application No. 10 2016 119 728.9 filed on Oct. 17, 2016, the disclosure of which is incorporated by reference. The international application under PCT article 21(2) was not published in English.

BACKGROUND OF THE INVENTION

1. Field of the Invention

The invention relates to a terahertz measuring device for measuring test objects as well as a corresponding method.

2. Description of the Related Art

Terahertz measuring devices emit terahertz radiation within a frequency band between 10 GHz and 10 THz towards test objects. The terahertz radiation is partially reflected on boundary surfaces of materials having different refraction indices so that distances between boundary surfaces and, therewith, layer thicknesses can be measured using the run-time of the THz radiation emitted and reflected and received.

Hereby, THz measuring devices are used e.g. immediately following the production of plastics extrusion products like pipes, sheets etc. in order to test these test objects for consistent layer thicknesses. Hereby, they allow contactless measuring of the layer thicknesses, as opposed e.g. to ultrasound devices requiring coupling means for bodily contact with test objects to be measured.

For a THz run-time measurement the THz measuring device must be positioned with its optical axis perpendicular to the surface of the test object so that the reflected radiation is reflected back exactly along the optical axis. Thus, THz measuring devices are generally mounted on exterior frames spaced and angular adjusted exactly in relation to the test objects and e.g. pivoted on a curvilinear rail around the test object so as to allow contactless measurements of the test object over the entire circumference.

Further, optical THz measuring systems are known, for example, for measuring varnish layers, in which a measuring head manipulated by an operator is connected to a fixed optical THz detector system via a fiber optical cable connection so that the measuring head can be positioned in a suitable manner.

SUMMARY OF THE INVENTION

The invention is based on the object of creating a THz measuring device and a THz measuring method allowing secure layer thickness measurements of test objects, in particular spherical or cylindrical test objects with little expenditure.

This task is solved by means of a THz measuring device as well as a method according to the invention. Preferred further developments are described below. Hereby, further, a measuring array is provided consisting of the THz measuring device and the test object to be measured.

The method according to the invention may be carried out, in particular, using a THz measuring device according to the invention and/or using a measuring array according to the invention. The THz measuring device according to the invention may, in particular, be used for carrying out a method according to the invention.

Thus, the THz measuring device is designed to include a support contour for contact with the surface of the test object and a grip region. Preferably, it is portable, i.e. the entire measuring apparatus can be carried by the operator, whereby it may be grabbed and positioned e.g. using one or two hands by its grip region. Thus the operator can grab the THz measuring device and position it by pressing it against the test object. Hereby, in contrast to measuring systems having merely a portable measuring head, the entire THz measuring device is portable so that the operator can cover even larger distances, e.g. in the case of an inspection in a warehouse, unimpaired local restraints by being connected to a stationary detector system via a connecting cord or fiber optical cable.

Preferably, the THz measuring device is independent as regards energy using an energy storage device, preferably, it is battery powered, i.e. supplied with energy by a battery or an accumulator. In the case of a fully electronic system e.g. a transceiver chip having a voltage supply in the microvolt range can be used.

The support contour serves for exact positioning, i.e. for perpendicular positioning of the optical axis of the THz measuring device in relation to the surface. Hereby, preferably, the support contour comprises exactly four alignment points that come into contact on the surface of a defined body, in particular, a cylindrical tube having a defined diameter. To that end the support contour is preferably designed to include a pair of contour lines spaced apart in a direction perpendicular to the optical axis and forming four alignment points when brought into contact with the cylindrical—or even spherical—body.

Thus, the four alignment points are, in particular equidistant to the optical axis and are preferably arranged in symmetry with each other, whereby, in particular, the two contour lines, on which two alignment points each are formed, can be designed in parallel or mirror symmetry to each other.

In particular, the support contour with its contour lines can also contact with pipes or spherical bodies having differing diameters. Thus, a support contour having two concave contour lines, i.e. lines extending towards the center and backwards, may serve to contact e.g. a first tube having a first, smaller diameter and a second tube having a larger second diameter, each of which forming alignment points on defined, differing spots of the contour lines.

Thus, the contour lines is preferably designed not spherical form form-fit contact with a cylindrical or spherical surface but, rather, in such a way that merely the defined four alignment points are formed. Hereby, the invention recognizes the fact that, in particular, such a formation of defined exclusive alignment points, in particular, of four alignment points, allows for advantages compared to support contours having a shape complementary to the test surface of the test object including, in particular, the option of measuring test objects having varying diameters.

Thus, the operator is able to conduct sample tests e.g. at different spots with little effort during production. He/she can grab the THz measuring device, place it against the tubular or spherical test object in a first measuring abgle position, and carry out a layer thickness measurement which is e.g. displayed directly on a display device of the measuring apparatus, e.g. as a numerical value indicating a layer thickness determined, or on an external display—e.g. using wireless data transmission. Moreover, e.g. the measured value can be compared and a signal can be output indicating whether or not the layer thickness determined is correct or faulty.

This alone allows for a quick and secure test with exact perpendicular alignment to the test object. Thus, such measurements deliberately do not avail themselves of the advantage of contactless measurement made possible by a THz measurement as oppose to e.g. an ultra-sonic measurement; however, it is recognized that in the case of a manual measurement using the THz measuring device such a contact can be made quickly and securely and causes no damage to the test object.

According to a preferred embodiment several pairs of contact lines, e.g. two pairs of contact lines offset against each other by 90°, may be formed so that a larger number of different diameters can be measured. The contact contour may comprise e.g. front corners and contour lines extending concavely away from the corners towards the center for contacting different pipe diameters or spherical diameters. Thus, an operator can apply the measuring device to the surface of the test object in a first alignment with the first pair of contour lines or, pivoted 90° about the optical axis hereto, with another pair of contour lines.

Hereby, in particular, operating errors can be avoided to a large extent because the operator will notice, when applying the device, whether a stabile position with extactly four alignment points has been reached or the measuring device tends to tilt or slip.

The support contour is preferably designed on a replaceable extension which is rigid and can be attached at a defined angular position. Thus, different extensions can be attached depending on the test object allowing for a high flexibility at low cost and quick conversion. The connection of the extension on the measuring head or on the basic housing may be e.g. a bayonet connection or another latching connection. The extension may be, in particular, a preferably metallic molded screen, preferably mounted on the measuring head of the THz measuring device, serving, at the same time, also as a shield against scattered radiation. Thus, the extension serves, on the one hand, as a defined contact alignment via the contour or contour lines and, on the other, as a shield against scattered radiation.

Preferably, the extension is made to be rigid, i.e. not flexible, so as to enable the defined contact.

The THz measuring device is designed to include, in particular, an elongated housing which also forms the grip region and, preferably, operating units like switches, buttons or similar, e.g. having a length of 25 to 50 cm. Hereby, in particular, fully electronic THz transmitter and receiver units are suitably lightweight so that the THz measuring device is portable and can be handled by the operator e.g. manually using one or two hands. The terahertz radiation lies in a frequency range between 0.01 and 10 THz, in particular, 100 GHz to 3 THz, and is emitted, in particular, fully electronically by means of a transmitter and receiver dipole, in particular, using frequency modulation or pulsed radiation. Thus, run-time measurements can be carried out directly in the time domain or correspondingly in the frequency domain, whereby, in principle, an optical system with run-time measurement is possible.

Hereby, in particular, a portable fully electronic THz measuring device with a battery or accumulator is of advantage since the fully electronic design comprising a THz transceiver chip requires no optical power components such as a laser and has a very low power consumption thereby allowing for a compact, portable design.

According to a preferred embodiment measurements can be carried out in several measuring angle positions or measuring positions respectively to achieve a thorough, in particular, even fully circumferential measurement of the test object, in that with the individual layer thicknesses measurements the measuring angle position of the THz measuring devices is measured also. To that end, preferably, an internal (longitudinal) acceleration sensor is used which measures an acceleration, e.g. along the optical axis, formed as a component of the gravitational acceleration. Thus, in the case of vertical positioning of the THz measuring device, the full gravitational acceleration is measured as—positive or negative—longitudinal acceleration and, consequently, in the case of e.g. horizontal arrangement of the longitudinal acceleration sensor no acceleration component; in-between there will be components of gravitational acceleration corresponding to the cosine of the ratio of the angle of incidence to the vertical.

Thus, it is possible to attain a precise survey of the measuring angle position with little effort, whereby readily available longitudinal acceleration sensors allow for sufficient accuracy of the measurement.

Hereby, e.g. even two longitudinal acceleration sensors may be arranged in directions offset against each other, e.g. by 90° or 45°, so as to distinguish symmetrical positions—left and right—from each other.

Thus, the operator is able to carry out a measurement at several successive measuring angle positions, or even in the course of a sliding movement around the test object in a practically continuous manner as a sequence of successive, quick measurements.

Hereby, each run-time measurement allows, first of all, the measurement of the distance between the surface and the transmistter and receiver unit, as the terahertz radiation upon hitting the surface is subjected to a difference in refraction index—in the case of plastics e.g. a refraction index of n=1.5—, and subsequently a layer thickness measurement of the front wall thickness and, if applicable, in the case of tubes comprising several layers, of the several layers. Further, e.g. an interior diameter can be measured as a subsequent air gap, and, even further, also a layer thickness of the back tube wall can be measured.

Together with the test object to be measured the THz measuring device forms a THz measuring array. This shows a high efficiency since the support contour of the measuring device is adapted to the external shape, in particular, the cylindrical external shape, of the test object.

BRIEF DESCRIPTION OF THE DRAWINGS

An embodiment of the invention is subsequently further illustrated by means of the attached drawings. These show in:

FIG. 10 the measurement of a test object at various measuring angle positions by means of the terahertz measuring device according to FIG. 9a;

DETAILED DESCRIPTION OF THE PREFERRED EMBODIMENTS

Figure 1:
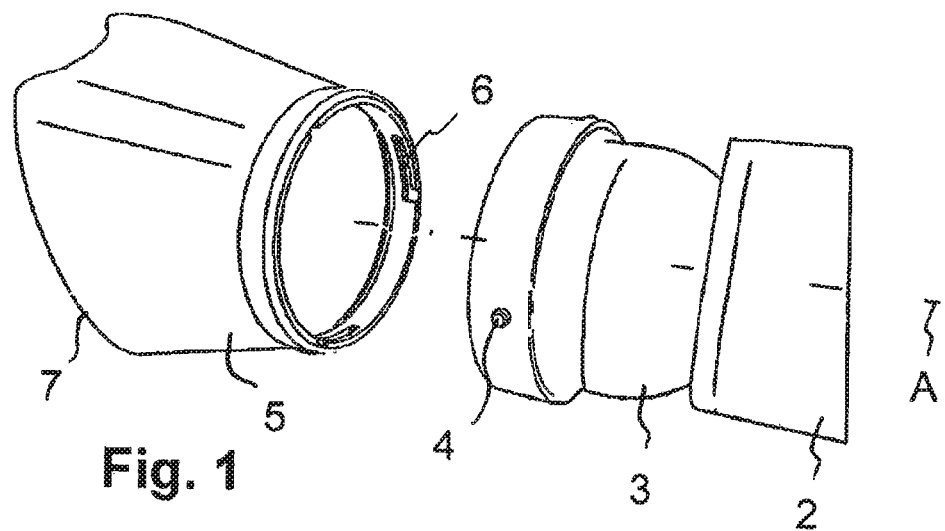
FIG. 1 the front area of a portable terahertz measuring device with the moulded screen removed.
Figure 2:
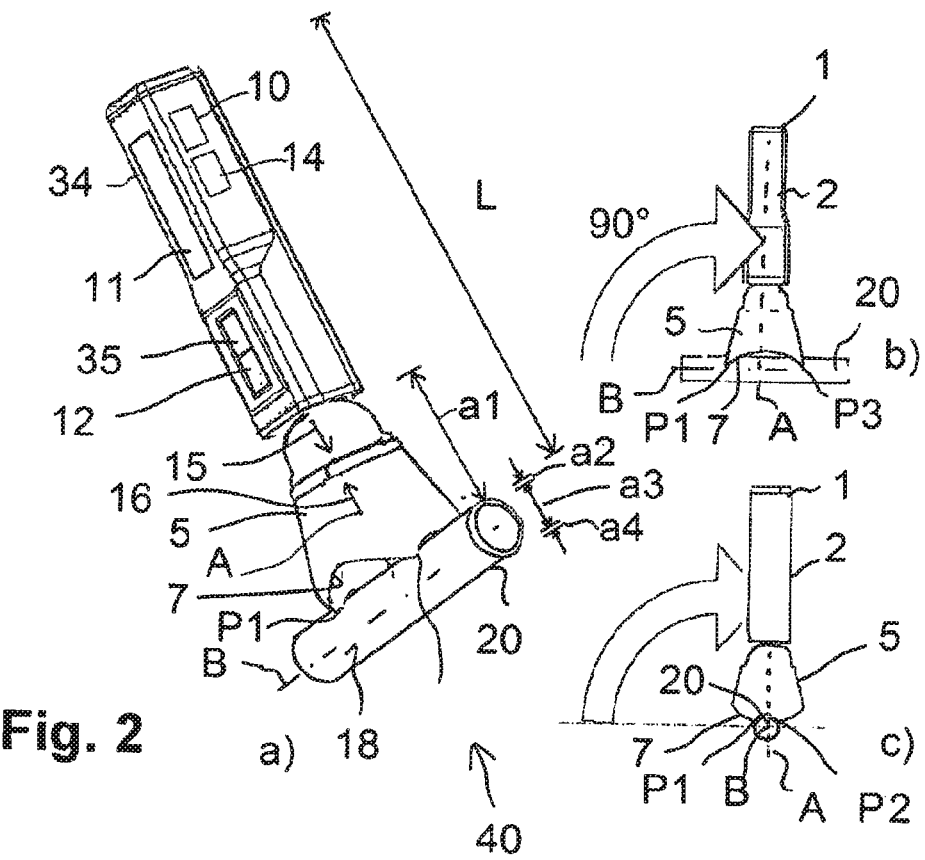
FIG. 2 the terahertz measuring device when applied to a first tube with a definined smaller first diameter, in various views.

A terahertz measuring device 1 according to e.g. FIG. 1 and FIG. 2 comprises basic housing 2, a measuring head 3 with radially projecting guide bolts 4, as well as a molded screen 5 serving as extension, which is, according to this embodiment, provided with bayonet slots 6 with which the guide bolts 4 of the measuring head 3 are attached. Thus, the guide bolts 4 and the bayonet slots 6 together form a bayonet connection allowing for a defined alignment along the optical axis A which also represents the symmetry axis of the terahertz measuring device 1. At its end opposite the bayonet slots 6 the molded screen 5 is provided with a contact contour 7 for being applied to test objects which shall be described in more detail below.

The terahertz measuring device 1 is portable by an operator; it is designed e.g. to have a length L of 25 to 50 cm and includes in the basic housing 2 an energy storage 11, e.g. a galvanic cell (battery, accumulator), as well as a controller device 10, operator controls 25, preferably a display device 12, and further a terahertz measuring electronics including a terahertz transmitter and receiver chip 14 that emits terahertz (THz) radiation within a frequency band between 10 GHz and 10 THz. Hereby, the terahertz measuring device or, respectively, its terahertz measuring electronics 14 is designed to be fully electronic (without optical elements such as e.g. femtosecond laser) and can thus be dimensioned in such a compact manner. Thus, the transmitter and receiver chip 14 emits terahertz radiation 15 along the optical axis A and detects reflected terahertz radiation 16. Hereby, the emitted terahertz radiation is partially reflected, in particular, upon transition between layers having different refraction indices n for the terahertz radiation 15. Therefore, if the boundary surfaces, e.g. the surface 18 of a test object 20, are positioned vertical (perpendicular) to the terahertz radiation 15 transmitted along the optical axis A, the reflected terahertz radiation 16 will again be reflected back along the optical axis A and received by the transmitter and receiver chip 14. The controller unit 10 is configured to determine the measuring angle position α from the ratio of the measured longitudinal acceleration ac to the gravitational acceleration g, in particular, under consideration of an algebraic sign of the measured longitudinal acceleration ac, ac1, ac2.

Hereby, the terahertz measuring device 1 allows distance measurement of distances to boundary surfaces of the test object 20, and following, in particular by means of superimposing the transmitted terahertz radiation 15 and the received terahertz radiation 16. Hereby, in particular, a frequency modulation or pulsed radiation may be provided.

Thus, when measuring a cylindrical plastic pipe as test object 20, with a perpendicular alignment of the optical axis A of the terahertz measuring device 1 in relation to the pipe axis B, layer thicknesses of the tube 20 can be determined from the measured signal, i.e. the distance a1 of the front surface or, respectively, the front side of the tested pipe 20 to the transmitter and receiver chip 14, also the layer thickness a2 of the pipe wall of the tube 20, thereafter the inner diameter of the pipe a3 as the thickness of the air gap to the opposite wall, and subsequently the wall thickness a4 as the thickness of the plastic layer of the opposite wall.

The exact vertical alignment of the optical axis A in relation to the pipe axis B is ensured by the molded screen 5 with its contact contour 7. The contact contour 7 is designed in such a way that it, when applied to the surface 18 of the test object 20, is in contact with the surface 18 at exactly four contact points P, i.e. P1, P2, P3, P4. To that end, the contact contour 7 is designed, on the one hand, symmetrical in such a way that it exhibits two contour lines 7-1 and 7-2 that are displaced in perpendicular direction—i.e. perpendicular to the optical axis A—, e.g. curved, which are e.g. identical or mirror symmetrical to each other. Thus, the contact points P1, P2, P3, P4 are designed in such a way that upon application of the contact contour 7 onto the cylindrical surface 18 at a defined first diameter D1, e.g. 40 mm, a perpendicular alignment of the optical axis A in relation to the pipe axis B is attained. To that end, the contact points P1, P2, P3, P4 preferably lie in a plane perpendicular to the optical axis A. Thus, the contour lines 7-1, 7-2 are shaped not spherical for large-area contact, but for a defined contact at two contact points P1, P2.

Figure 3:
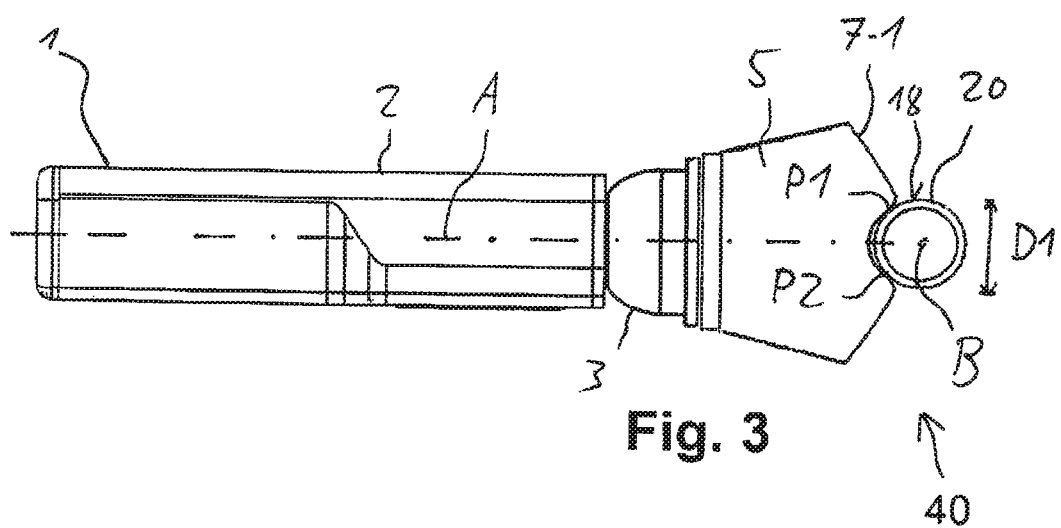
FIG. 3 a view corresponding to FIG. 2c) of the appliance of the measuring device to the first tube.
Figure 4:
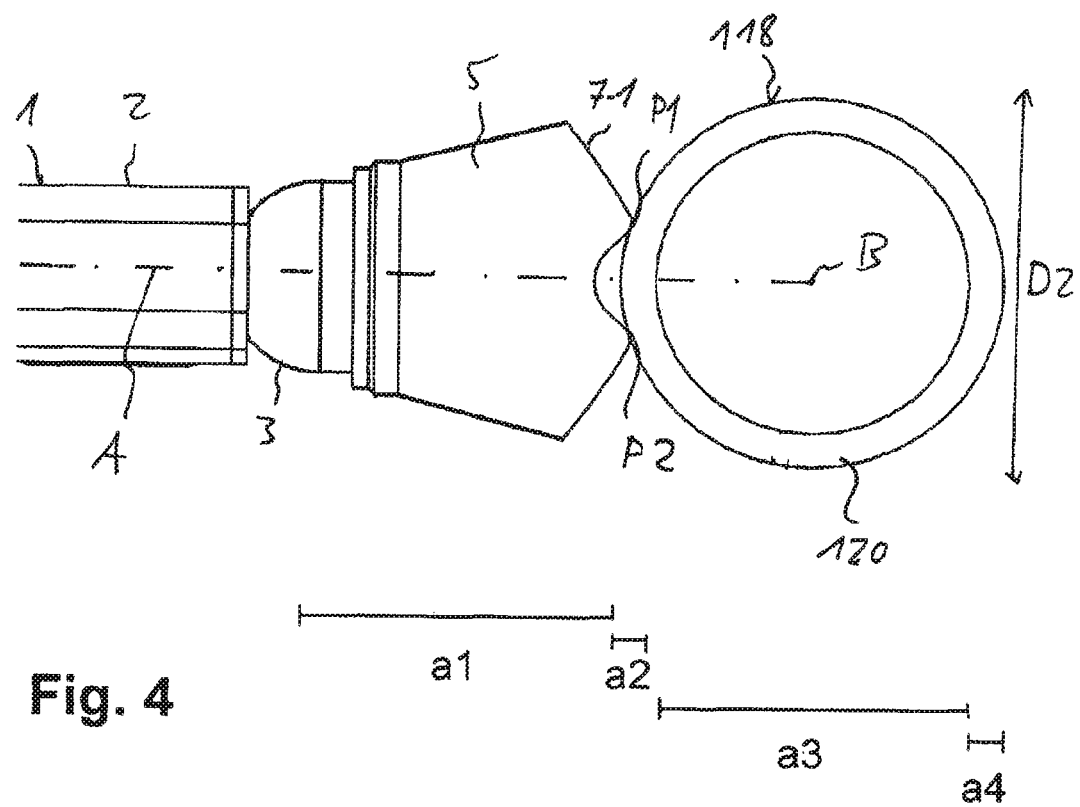
FIG. 4 the terahertz measuring device when applied to a second tube with a larger second diameter.
Figure 5:
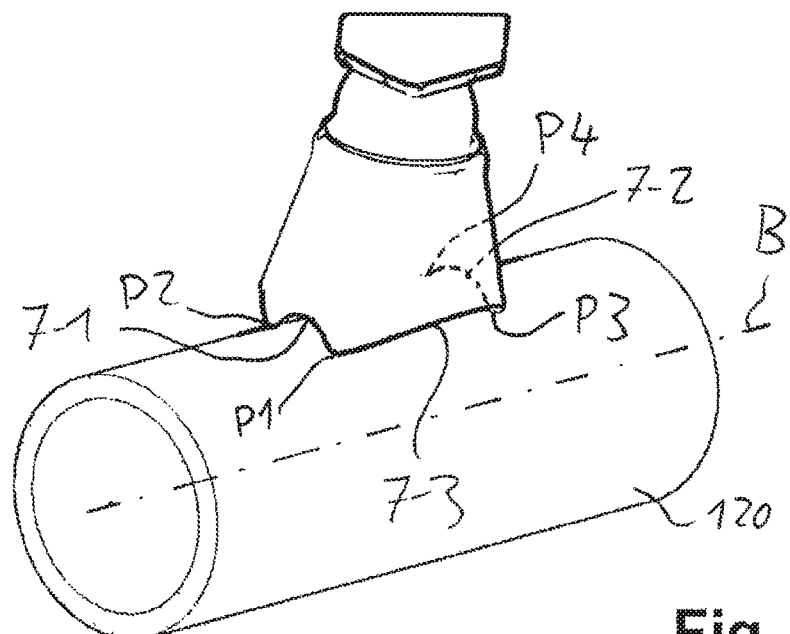
FIG. 5 a perspective view of the arrangement according to FIG. 4.

Moreover, the contour lines 7-1 and 7-2 may have a path such that they can receive different surface curvatures, i.e. different pipe diameters, as shown in FIGS. 3 and 4: According to FIG. 3 a tube having a small first diameter D1 as test object 20 is received at contact points P1 and P2 in a central area of the contour line 7-1 (and, displaced against the drawing plane, also according to the contour line 7-2), while, according to FIG. 4 a second pipe having a larger second diameter D2, e.g. D2=125 mm, as test object 120 which is in contact with contact points P1 and P2 at the contour line 7-1 which is offset towards the outside in relation to the center or optical axis. Thus, by means of a suitable contour line 7-1—and the contour line 7-2 displaced in relation thereto but identical or, respectively, symmetrical—several test pipes 20, 120 with different diameters can be captured in a defined manner or, respectively, the THz measuring device 1 can always be positioned in a defined manner and perpendicular to the pipe axis D.

The basic housing 2 is equipped with a grip region 34 so that an operator can grab the terahertz measuring device 1—e.g. using only one hand—and press it at the molded screen 5 towards the front (in the direction of the optical axis A) against the test object 20, 120, i.e. against the surface 18, 118. This automatically creates a stable contact of the molded screen 5 at the four contact points P1, P2, P3, P4, whereby, owing to the sufficient lateral distance—between P1, P2 on the one hand, and P3, P4 on the other—applying contact pressure at minimal force safely prevents wobbling thereby attaining exact positioning.

Hereby, the moulded screen 5 can be made of metal thereby, preferably, also shield against scattered radiation, i.e. serve as a moulded screen and for creating the contour.

Thus, by virtue of the two contour lines 7-1 and 7-2 spaced apart in perpendicular direction alone, precise measurements of tubes 20, 120 with different diameters D1, D2 can be carried out.

Figure 6:
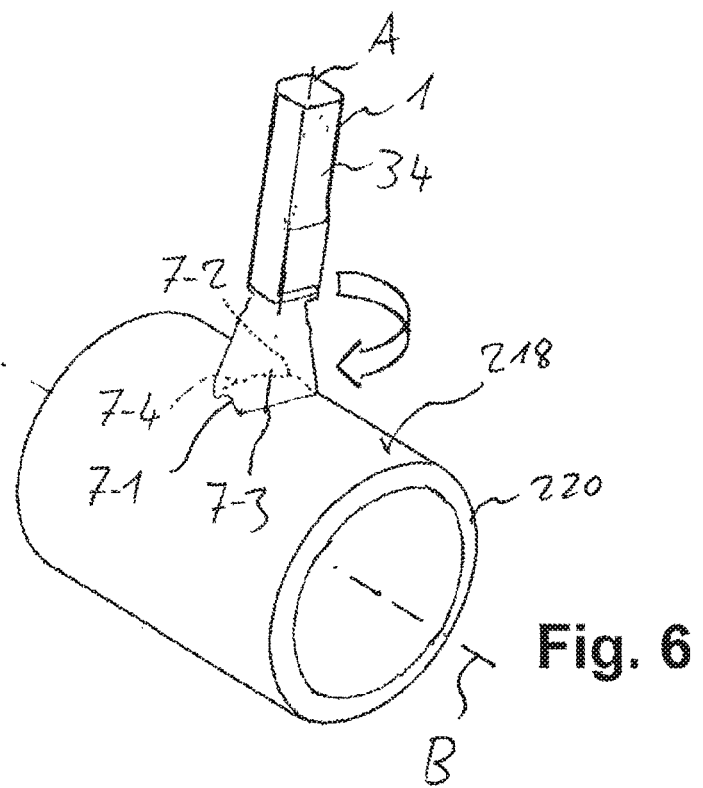
FIG. 6 the terahertz measuring device being applied to a third tube with a larger third diameter in a position offset by 90° against FIG. 5.
Figure 7:
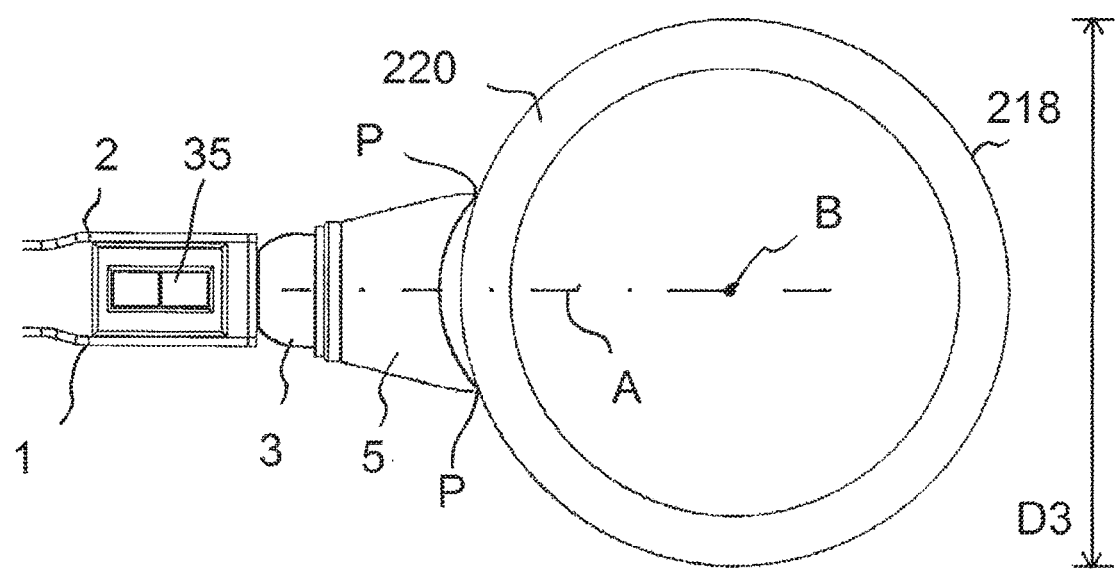
FIG. 7 a lateral view of the arrangement according to FIG. 6.

Moreover, using the same molded screen 5, also a measurement of larger pipes can be carried out, e.g. according to FIGS. 6 and 7 of the third tube 220 with a diameter D3, e.g.

D3=315 mm. To that end the THz measuring device 1 is merely pivoted about 90° and, consequently, by means of the further contour lines 7-3 and 7-4, applied to the surface 218 of the test object 220 which is designed to have a correspondingly larger curvature. The further contour lines 7-1 and 7-2 do not impede this measurement because, again, contact points P1, P2, P3, P4 are created only at the contour lines 7-3 and 7-4. Hereby, too, using the contour lines 7-3 and 7-4 pipes with several diameters can be measured in that a suitable concave curvature of the contour lines 7-3 and 7-4 is created allowing for the capturing of pipes with different diameters at different contact points P.

In principle, a moulded screen 5 can be designed as having more than two pairs of contour lines. However, in principle, it is of advantage, when measuring a larger number of different tubes, to exchange the moulded screens by means of the afore-mentioned bayonet connector made of guide bolts 4 and bayonet slots 6.

Using the portable THz measuring device 1 preferably allows even measuring a test object 20 120, 220 across its entire circumference in that the THz measuring device 1 includes a sensor system for determining position or inclination.

Figure 8:
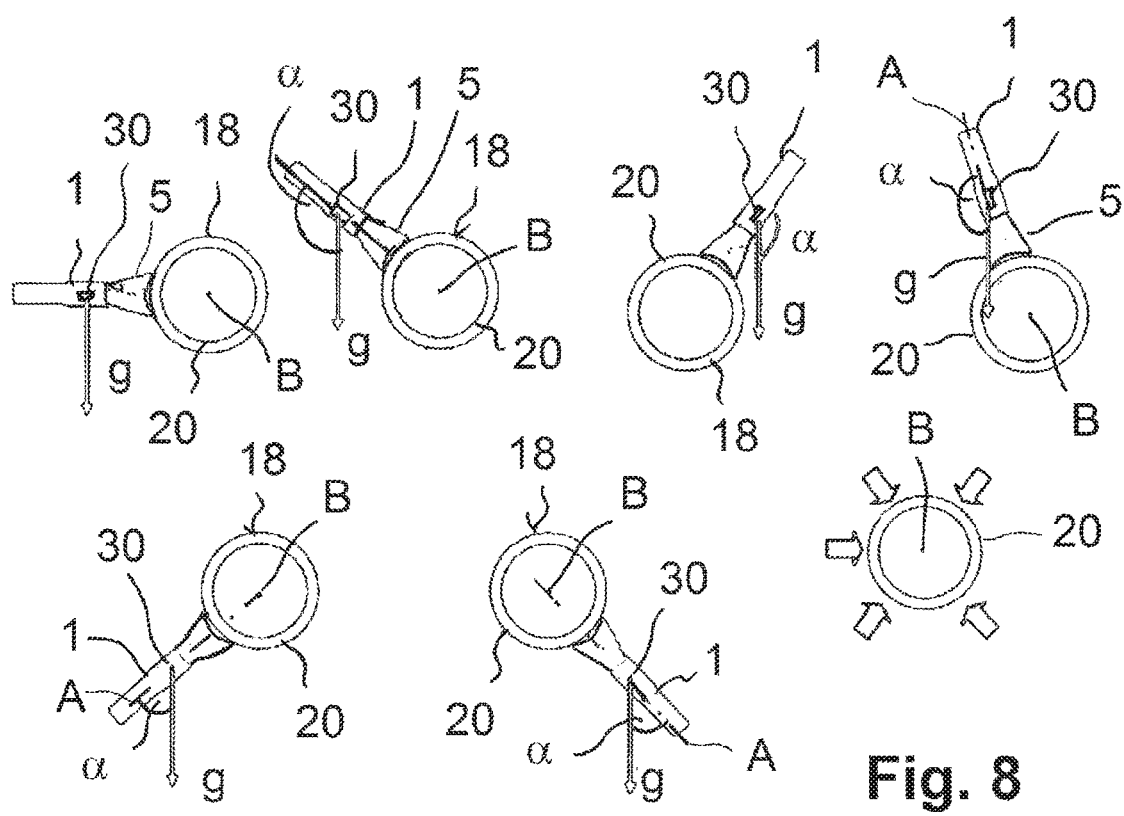
FIG. 8 several measuring angle positions of terahertz measuring device according to a further embodiment for measuring the entire circumference of the tube.

According to the embodiment of FIG. 8 a THz measuring device 1 comprises an acceleration sensor 30 which is sensitive enough to measure the gravitational acceleration g or, respectively, shares of g. The acceleration sensor 30 comprises a sensing direction or, respectively, longitudinal direction which may be, in particular, the optical axis A. This longitudinal direction, in each position or location, exhibits a defined measuring angle position α in relation to the vertical, i.e. the direction of gravitational acceleration g. Thus, the THz measuring device 1 can be positioned successively in several measuring angle positions α along the circumference of the test object 20. Thus, when applied vertically, i.e. on the top side (uppermost position), α=0, when applied on exactly the bottom side, consequently, α=180° or, respectively, Π. Thus, the result for the horizontal position shown in FIG. 8 in the left upper corner is α=270°.

Thus, the acceleration sensor 30 in each case measures an acceleration ac, which results from $$ac = g * \text{arc cos } \alpha.$$

Figure 9:
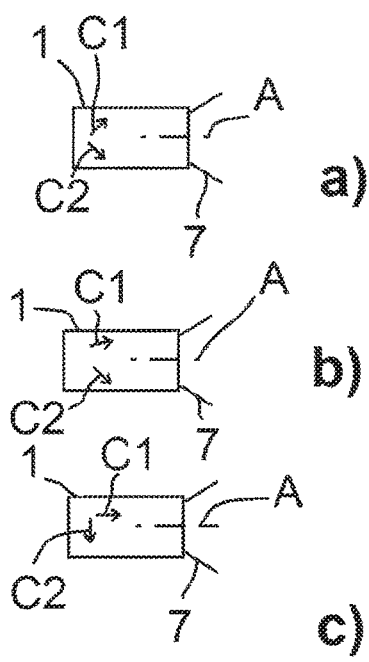
FIG. 9 terahertz measuring devices having two acceleration sensors according to various embodiments in the partial images a), b), c)
Figure 11:
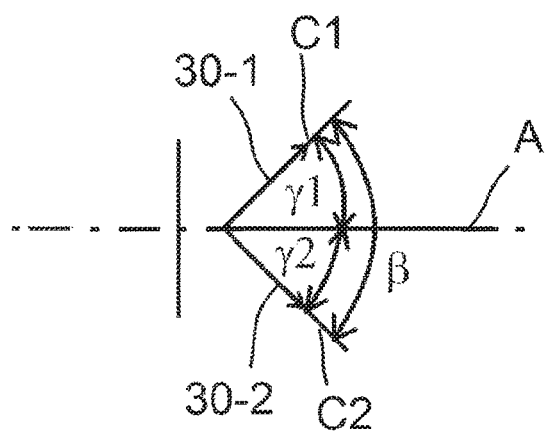
FIG. 11 the alignments and angles of the acceleration sensors according to FIG. 9 relative to the optical axis.

In addition, e.g. a second acceleration sensor 30-2 may be provided which is aligned in a second sensing direction C2 offset in relation, not parallel, to the first sensing direction C1 of the first acceleration sensor 30-1 so that symmetrical angles of inclination (left and right) having identical values can be distinguished also. FIG. 9 shows in the partial Figures a), b), c) various such embodiments having two acceleration sensors 30-1, 30-2, the sensing directions C1, C2 of which are each offset against each other. According to FIG. 9a) a first sensing direction C1 of the first acceleration sensor 30-1 and a second sensing direction C2 of the second acceleration sensor 30-2 are offset by an angular displacement β, where, according to FIG. 9a) β=90°. FIG. 11 shows this arrangement in more detail: According to this embodiment, the sensing directions C1 and C2 lie symmetrical to the optical axis A, i.e. the first angular distance γ1 of the first sensing direction C1 to the optical axis A is—as far as the value is concerned—equal to the second angular distance γ2 of the second sensing direction C2 to the optical axis A; thus, the acceleration sensors 30-1 and 30-2 are tilted or mirrored respectively about the optical axis. Hereby, embodiments with γ1 and γ2<90° so that both sensing directions C1 and C2 face the test object 20 are especially preferred.

FIG. 9b) shows an embodiment alternative hereto in which the sensing directions C1 and C2 have unequal angular distances γ1, γ2 to the optical axis A, whereby they are offset relative to the optical axis preferably in different directions. According to the embodiment of FIG. 9c) the first sensing direction C1 lies in the direction of the optical axis A and the second sensing direction C2 in a direction not parallel hereto, e.g. orthogonally, so that the sensing directions C1, C2 span the angular offset of β=90°.

Figure 10:
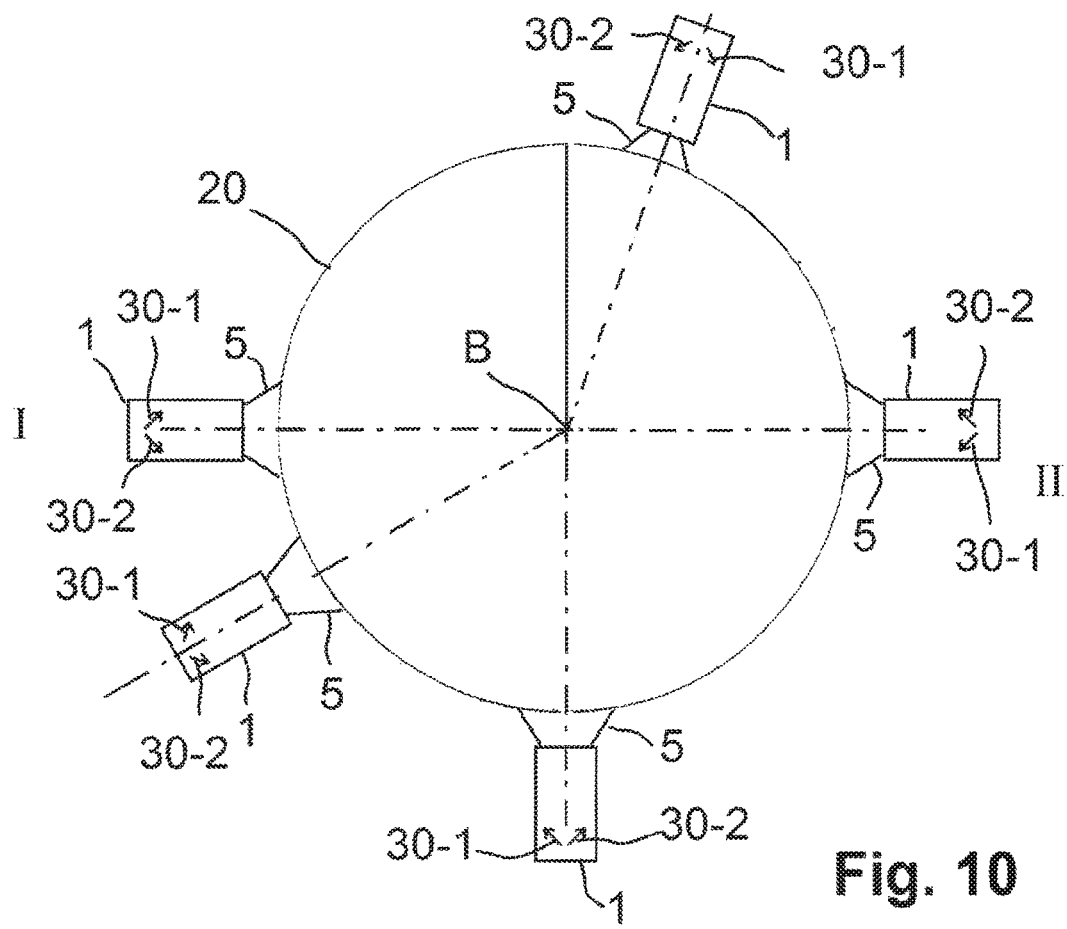

Thus, it is an advantage according to the representation of FIG. 10, in particular, that the sensing directions C1, C2 span the plane in which the optical axis A also lies. Thus, the various measurement shown in FIG. 10 result in pairs of measured values of the measured accelerations ac1, ac2 of the two acceleration sensors 30-1 and 30-2 which allow, when combined, an unambiguous determination of the measuring angle position. Thus, the two horizontal positions I and II shown in FIG. 10 are distinguishable from each other because the first acceleration sensor 30-1 measures in the left position I an upwards, i.e. negative, first acceleration ac1 while it measures in the right position II a downwards, i.e. positive, first acceleration ac1, and correspondingly, vice versa, the second acceleration sensor 30-2 measures in the right position I a downwards, i.e. positive, second acceleration ac2 and in the right position II an upwards, i.e. negative, second acceleration ac2.

This can be illustrated by an example: when measuring the angle of inclination α in the Figures clockwise in relation to the vertical downwards (direction of gravitational acceleration g), therefore, in the embodiment of FIG. 9a) the result is γ1=γ2=45° preferably in the left horizontal position I a first acceleration ac1=g*cos(135°)=−g*cos(45°) and a second acceleration ac2=g*cos(315°)=g*cos(45°).

and vice versa in the right horizontal position.

These measurements can also be carried out using the terahertz measuring devices according to FIG. 9b) and FIG. 9c).

Thus, the two acceleration sensors 30-1 and 30-2 in a non-parallel alignment in this plane are sufficient, whereby the acceleration sensors 30-1 and 30-2 each supply as measured value a value and a sign, for unambiguous definition of the measuring angle position on the test object 20.

Thus, layer thickness measurements can be combined with measurements of the measuring angle position α. Thus, for a measurement according to FIG. 8 for measuring the entire circumference of a test object 20 the following steps are being carried out:

providing the THz measuring device 1 having a suitable molded screen 5 (Schritt St1), applying the THz measuring device 1 by means of the molded screen 5 in such a way that two spaced-apart contour lines 7-1 and 7-2 each having two contact points, i.e. P1, P2, P3, P4, come into defined contact. To that end, an operator presses the THz measuring device 1 at its molded screen 5 with light force against the surface 18 of the test object 20; this is executed by the operator by hand or manually without any further means (step St2), commencing a measurement, e.g. by pushing an operator control 35 at the basic housing 2, causing THz radiation 15 to be emitted and reflected THz radiation 16 to be measured, whereby, further, the measuring angle position α of the acceleration sensor 30 is captured and associated with THz-measuring signals, (step St3)

evaluating the measuring signal, i.e. the received THz radiation 16 for determining run-times and, thereby, layer thicknesses a1, a2, a3, a4 and the measuring angle position α(step St4), returning to step St2, while re-adjusting the measuring angle position α by reapplying or sliding along on the surface 18, until the test object 20 has been measured across its entire circumference.

The angular position measuring device 30, 30-1, 30-2 comprises two acceleration sensors 30-1, 30-2 with sensing devices C1, C2 which are aligned not parallel, e.g. at an angular displacement β of 45° or 90° in relation to each other, for unambiguous determination of the measuring angle position α from the two longitudinal accelerations ac1, ac2 of the two acceleration sensors 30-1, 30-2.

LIST OF REFERENCE NUMERALS

1 terahertz measuring device
2 basic housing
4 guide bolt
3 measuring head
5 moulded screen
6 bayonet slots
7 support contour
7-1, 7-2, 7-3, 7-4 contour lines
10 controller device
11 energy storage, preferably battery or accumulator
12 display device
14 terahertz transmitter and receiver device
15 terahertz radiation
16 reflected terahertz radiation
surface
20 first test object
30 acceleration sensor
30-1 first acceleration sensor
30-2 second acceleration sensor
34 grip region
35 operator controls
40 THz measuring array
118 surface
218 surface
120 second test object
220 third test object
ac, longitudinal acceleration
ac1, ac2 first, second longitudinal acceleration
g gravitational acceleration
A optical axis
B tube axis
C1 first sensing direction
C2 second sensing direction
P, P1, P2, P3, P4 support points
a1 distance between surface 18 and transmitter, receiver device
a2 layer thickness of the tube wall 21
a3 interior diameter of tube
a4 wall thickness of opposite wall
D1 first diameter
D2 second diameter
D3 third diameter
I left position
II right position
L length
α a measuring angle position
β angular offset
γ1, γ2 first angular distance, second angular distance

The invention claimed is:

1. A THz measuring device for determining at least one layer thickness of a test object, said measuring device comprising:

a THz transmitter and receiver unit for emitting THz radiation along an optical axis and for receiving reflected THz radiation along said optical axis, and a controller unit for driving said transmitter and receiver unit, wherein said measuring device comprises a grip region for grabbing and positioning by an operator, and said measuring device comprises, at a front end area, a support contour including several support points for being applied to a curved surface of the test object, for perpendicular positioning of the optical axis on the surface, said support contour is designed such that, when said support contour is applied onto a cylindrical surface of the test object having a defined diameter, exactly four contact points come into contact, said four contact points lying in a plane perpendicular to the optical axis, and said support contour comprises two contour lines spaced apart in a crosswise direction perpendicular to the optical axis for a surface to be measured, whereby at each contour line always two contact points for the defined surface to be measured are formed, and whereby said contour lines are designed in parallel or in mirror symmetry to each other.

2. The THz measuring device according to claim 1, wherein said THz measuring device is portable.

3. The THz measuring device according to claim 1, wherein said support contour is formed on a replaceable extension that can be rigidly mounted at a defined angular position.

4. The THz measuring device according to claim 3, wherein said extension is a molded screen made of metal which is provided for shielding scattered radiation.

5. The THz measuring device according to claim 4, wherein said extension, at a back end of said extension, comprises a connector device for defined attachment to guide bolts of a measuring head or a base corpus, and comprises said support contour at a front end of said extension.

6. The THz measuring device according to claim 1, wherein, using one pair of contour lines, always at least two different surfaces can be measured by virtue of contact, whereby the support points of the different surfaces are formed at different positions of said contour lines, whereby said contour lines are designed to be essentially concave and to extend backwards towards their center.

7. The THz measuring device according to claim 1, wherein said support contour comprises two pairs of contour lines which are offset against each other at the support contour in a swivel direction about the optical axis for measuring cylindrical or spherical surfaces having different diameters.

8. The THz measuring device according to claim 1, wherein said measuring device further comprises one or more elements of the following group:

an energy storage for independent supply of electricity for the THz transmitter and receiver unit and the controller unit, operator controls for starting up a layer thickness measurement, an elongated base corpus, a display device.

9. The THz measuring device according to claim 1, wherein said measuring device comprises an angular position measuring device for measuring an angular position when applied to the test object, for measuring the entire circumference of the test object when measuring in several measuring angle positions across the circumference.

10. The THz measuring device according to claim 9, wherein said angular position measuring device comprises at least one acceleration sensor for measuring a longitudinal acceleration as a component of gravitational acceleration, and said controller unit is configured to determine the measuring angle position from the ratio of the measured longitudinal acceleration to the gravitational acceleration.

11. The THz measuring device according to claim 10, wherein said angular position measuring device comprises two acceleration sensors with sensing devices aligned not parallel for unambiguous determination of the measuring angle position from the two longitudinal accelerations of the two acceleration sensors.

12. The THz measuring device according to claim 1, wherein said controller device is arranged to determine run-times of the emitted and reflected THz radiation and, on the basis of these, at least one layer thickness, an interior diameter, and back wall thickness of a tube as test object.

13. The THz measuring device according to claim 1, wherein said Terahertz transmitter and receiver unit emits terahertz radiation within a frequency range between 0.01 and 10 THz.

14. A THz measuring array, comprising the THz measuring device according to claim 1 and the test object to be measured, whereby the support contour is designed to include the several support points for being applied to the curved surface of the test object and is designed for perpendicular positioning of the optical axis on the surface.

15. A method for measuring at least one layer thickness of a test object using a THz measuring device, comprising at least the following steps:
  providing a portable THz measuring device having a THz transmitter and receiver unit, a base housing and a contact contour formed on a front end, wherein said contact contour is designed such that, when said contact contour is applied onto a cylindrical surface of the test object having a defined diameter, exactly four contact points come into contact,
  applying the THz measuring device by means of the contact contour to the surface of the test object by means of pressing against the test object in such a way that the contact contour is in contact with the surface at exactly the four contact points and an optical axis of the transmitter and receiver unit is aligned perpendicular onto the surface, said four contact points lying in a plane perpendicular to the optical axis, wherein said contact contour comprises two contour lines spaced apart in a crosswise direction perpendicular to the optical axis for a surface to be measured, whereby at each contour line always two contact points for the defined surface to be measured are formed, and whereby said contour lines are designed in parallel or in mirror symmetry to each other,
  carrying out at least one distance measurement by emitting THz radiation towards the test object with partial reflection on at least two boundary surfaces of the test object and detecting reflected THz radiation, and
  determining at least one layer thickness of the test object from a run-time measurement of the emitted and reflected THz radiation.

16. The method according to claim 15, wherein the test object is a pipe and the steps of applying and carrying out the distance measurement are carried out successively in various measuring angle positions across the circumference of the test object,
  whereby, in the step of carrying out the distance measurement, further, a measuring angle position of the THz measuring device is determined.

* * * * *